United States Patent [19]

Hopfe et al.

[11] 4,241,691
[45] Dec. 30, 1980

[54] DOCTOR BLADE HOLDER

[75] Inventors: Harold H. Hopfe, Longmeadow; Robert H. Mosher, West Springfield, both of Mass.; Lawrence R. Sedgeley, Manchester, Mo.

[73] Assignee: Monsanto Company, St. Louis, Mo.

[21] Appl. No.: 938,178

[22] Filed: Aug. 30, 1978

[51] Int. Cl.³ ............................................. B05C 11/02
[52] U.S. Cl. ................................. 118/126; 15/256.51; 101/365
[58] Field of Search ............... 118/126, 123, 121, 122, 118/124, 261; 101/365, 120, 169, 157; 15/256.51

[56] References Cited

U.S. PATENT DOCUMENTS

| 3,014,454 | 12/1961 | Smejda | 118/126 X |
| 3,143,438 | 8/1964 | Campbell | 118/126 |
| 3,192,895 | 7/1965 | Galer | 118/126 |
| 3,229,662 | 1/1966 | Means | 118/126 |

Primary Examiner—Bernard D. Pianalto
Attorney, Agent, or Firm—David Bennett; William J. Farrington; Edward P. Grattan

[57] ABSTRACT

A doctor blade holder is described that is adapted to accommodate a doctor blade in a slot in the holder and is provided with a resilient means at the base of the slot such that a blade accommodated within the slot is able to move into and out of the slot in response to variations in pressure against the doctoring edge of the doctor blade.

6 Claims, 4 Drawing Figures

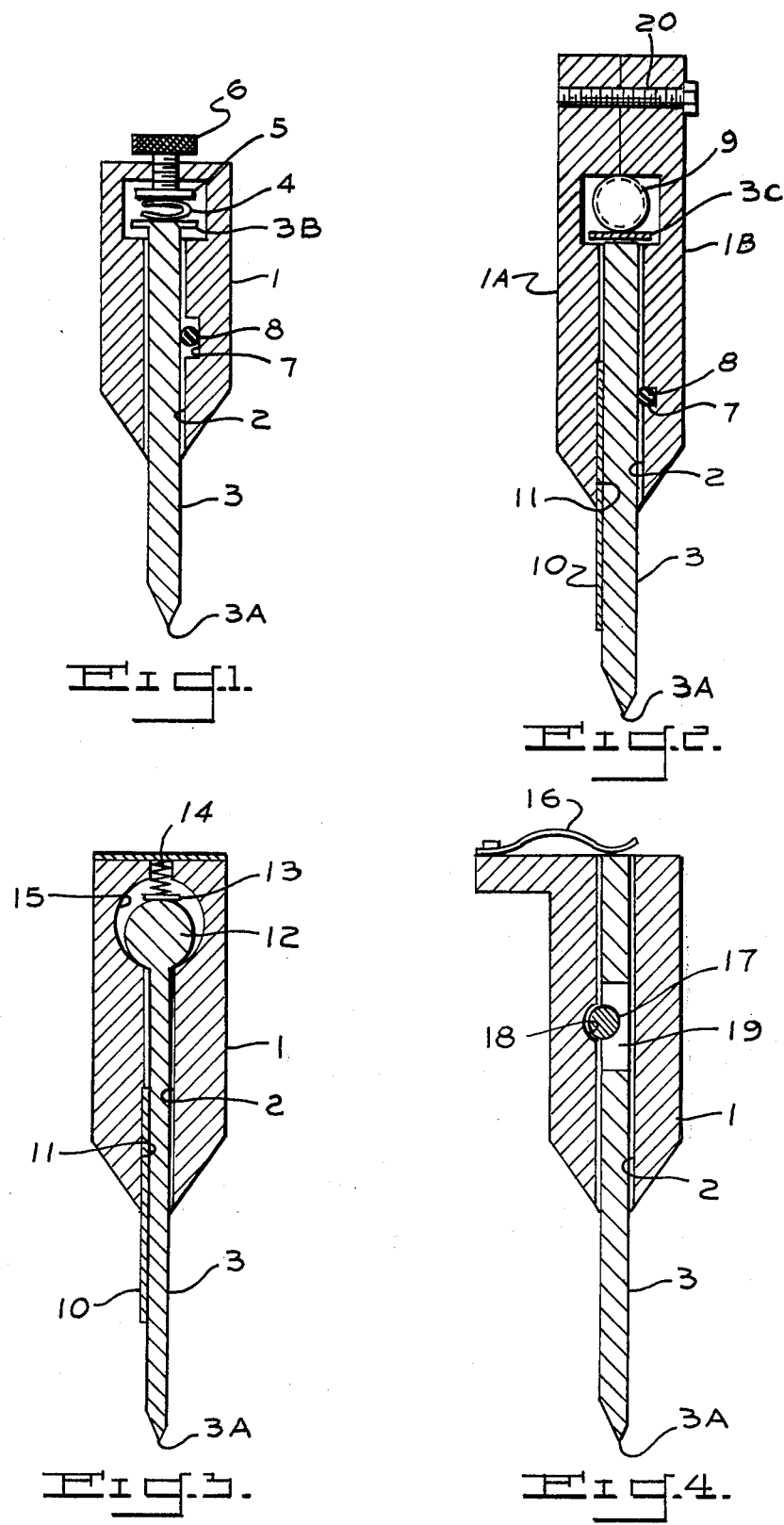

DOCTOR BLADE HOLDER

BACKGROUND OF THE INVENTION

This invention relates to a doctor blade holder that is useful whenever a thin even coating is to be applied to a substrate.

A conventional doctor blade comprises a usually rectangular plate with one side ground to a fine edge (the doctoring edge). In a conventional operation this doctoring edge cooperates with a substrate, which can be a roll surface, a horizontal surface or a flexible sheet carried upon such a surface, to control the thickness of a coating applied to the substrate or to wipe off any excess liquid. The present invention relates to the latter manner of using a doctor blade and relates particularly to a doctor blade arrangement used to control the application of a liquid to a moving surface.

DISCUSSION OF THE PRIOR ART

The traditional doctor blade used for applying a liquid to a moving surface is one in which the blade is rigidly fixed in a pivoting or sliding holder and is set such that its doctoring edge contacts the moving surface as it moves past the blade. The blade itself can be rigid or have a degree of flexibility with the latter configuration preferred for many purposes. Flexible blades however are most often used in conjunction with a backing plate that restricts the amount of flexing that can take place.

The pressure between the doctor blade and the surface contacted is usually controlled by a manually adjustable mechanism such as a screw. This arrangement however has serious disadvantages since it rarely happens that during operation, the pressure exerted by the blade on the surface of the substrate is uniform. Thus initially the variation in pressure causes the blade to be forced back or flex slightly at intervals and this in turn leads to a loosening of the setting of the doctor blade, uneven application of liquid, and a gradual wearing down of the blade and perhaps also the substrate.

A doctor blade support device has now been discovered that tends to minimize changes in local contact pressure between the blade and the substrate and thereby improves the life of the blade and the substrate surface and, in use, gives a fine uniform application of liquid.

DESCRIPTION OF THE INVENTION

The invention provides a doctor blade holder comprising a body member having a slot adapted to receive a doctor blade in a slidable fit within the slot with the doctoring edge of the blade projecting from the open end of the slot and, disposed within the slot, a resilient means adapted to bias a doctor blade retained within the slot away from the closed end of the slot.

In use a doctor blade, supported in the doctor blade holder, is positioned with respect to a moving substrate surface such that the doctoring edge is angularly positioned, for example at right angles to a direction of travel of the surface and is urged towards the surface by the resilient means within the slot. Any non-uniformity in the surface is translated into a variation in pressure against the doctor blade and, by its ability to move inside the holder against the resilient means, the blade tends to absorb any such local pressure variation without permanent deformation and return readily to its normal operating position once the pressure variation has been removed. This is a very valuable feature since it greatly extends the useful life of both surface and blade.

The nature of the resilient means can vary a great deal. For some purposes a spring or a rubber strip or a foamed thermoplastic pad may be adequate. For others it may be advantageous to provide that the resilient base material is in the form of an inflated tube such that the resilience of the base can be adjusted by controlling the degree of inflation of the tube. This feature can also be provided by making any rubber or foam resilient base material replaceable by one having greater or lesser resilience but it will be appreciated that the inflatable tube expedient is by far the more adaptable and convenient arrangement.

The location of the resilient means is most usually in the slot adjacent or at its closed end. In one embodiment however the resilient means is accommodated in opposed recesses in the sides of the slot intermediate between the closed and open ends and parallel to both. Such recesses and the resilient means retained therein in such an embodiment are adapted to cooperate with wings of appropriate dimensions formed on the doctor blade surface and projecting into the recesses when the blade is in position in the holder, such that the resilient means bear against the surfaces of such wings to bias the blade away from the closed end of the slot. This embodiment has the advantage that the wings also cooperate with the sides of the recesses to retain the blade within the holder when not actually in contact with a substrate.

The doctor blade itself may be of any convenient elastic material of relatively low modulus such as a metal, usually steel, or, more preferably, a plastic. Plastic blades are commonly formed from tough plastics rather than those which are easily deformed. The plastic blades can be made from nylon, polyester, toughened styrenics, polyacetals and the like but the preferred plastics are polytetrafluoroethylene and ultrahigh molecular weight polyethylene. The plastic can be reinforced with mineral particles or carbon or glass fibers or the like.

The blade holder may be a unitary structure or it may be in two halves so shaped that when they are brought together they define a holder with a slot adapted to accommodate the doctor blade. The dimensions of the slot are such that the doctor blade is able to slide into and out of the slot but not such that there is substantial freedom of movement in a direction perpendicular to the plane of the blade. The thickness of the slot should therefore be not more than about 0.1 mm. greater than the thickness of the doctor blade to be received within the slot.

Frequently it is desirable that the doctor blade be provided with a backing plate to inhibit flexing of the blade when in use. Such a backing plate is conventionally located partly within the slot in the blade holder and in face-to-face relationship with the blade. The backing plate projects beyond the slot and terminates at a point intermediate the slot opening and the doctoring edge of the blade.

It is often convenient to provide some means of limiting the ability of the doctor blade to more in response to the urging of the resilient means because if this is not done, when the doctor blade is removed from contact with the movable substrate, the blade could easily become detached from the holder and be lost, damaged or cause injury to an operator. This may be achieved by providing that the slot has, at its closed end, a channel such that between the slot proper and the channel there is a pair of shoulders which are adapted to cooperate with a double flange formed on the edge of the doctor blade opposed to the doctoring edge, to retain the blade in the slot. This also has the effect of providing a flat surface against which the resilient means can act and this is very advantageous especially where the blade itself is thin. A single flange/shoulder structure, though less advantageous, can also be used.

Alternative structures to the above flange/shoulder devices include providing the edge of the blade opposite the doctoring edge with a beading, for example round or triangular in cross-section and providing that the channel at the base of the slot has a configuration such that the beading is loosely retained in the channel.

A different approach to the problem of retention of the doctoring blade in the holder device could be to provide retaining means associated with the opposed walls of the slot and adapted to cooperate with two or more apertures cut in the body of the doctor blade and running at right angles to the doctoring edge so as to allow a limited degree of movement in response to the urging of the resilient means. Such retaining means would include spring-loaded bearings, retractable pins and the like.

The movement of the blade inside the slot may be subject to substantial frictional opposition and it is often desirable to provide a deformable beading known as a "squirmer" set in a groove in one of the inside faces of the slot. The squirmer used is of a diameter that is slightly greater than the depth of the groove in which it is located such that it exerts a resilient pressure against the surface of a doctor blade inserted in the slot so as to restrict movement of such a blade in a direction perpendicular to the sides of the slot. The width of the groove is usually about the same as the diameter of the squirmer such that when the blade responds to the competing forces applied thereto by the movable surface and the resilient means, the tube deforms to accommodate the movement of the blade. The squirmer can be formed from any solid or hollow tubular material that will permit ready deformation to accommodate the relatively limited movements of the doctor blade within the slot. One suitable material that may be used is neoprene but any elastomer can be substituted. The squirmer also acts as a seal where the liquid being applied to a substrate has a tendency to run up the doctor blade and into the holder. This is important if the resilient means selected could be adversely affected by the liquid.

It is also frequently desirable that the ends of the slot be provided with means for restraining movement of the blade in a direction across the line of travel of the movable substrate surface. The restraint can be a permanent closing of the slot or perhaps a removable cover permitting ready removal of the blade without changing the position of the blade holder. The blade holder is provided with means for locating it in such a position that the blade contacts the substrate firmly while still permitting the blade a limited degree of movement against the resilient means to ensure optimum accommodation between doctoring edge and substrate.

The device of the invention can be used in a wide range of applications including applying adhesives, coating compositions or finishing lacquers to a substrate surface carried on a horizontal conveyer roll or other movable surface such as a cylindrical roll. It can also be used to control ink application to a rotogravure roll in a printing operation or remove cake from a rotary vacuum filter, etc.

BRIEF DESCRIPTION OF THE DRAWING

FIGS. 1-4 are alternate embodiments of doctor blade holders embodying the invention. Each is shown in cross-section.

DESCRIPTION OF PREFERRED EMBODIMENTS

The invention is now more particularly described with reference to the Figures which represent alternative doctor blades located within the holders to illustrate the cooperation between the two.

Each of the Figures represents a diagrammatic cross-sectional view of one embodiment of the invention.

In FIG. 1, a doctor blade holder, 1, is provided with a slot, 2, adapted to receive a doctor blade, 3, having a doctoring edge, 3A, and a double flange, 3B, along the edge opposed to the doctoring edge.

A leaf spring, 4, bears against the flanged edge of the doctor blade and against a plate, 5, fixed to a plurality of adjusting screws, 6, (one only shown) mounted in the doctor blade holder and adapted to increase or decrease the compression of the leaf spring, 4.

The blade holder is provided with a groove, 7, fitted with a neoprene squirmer, 8, the diameter of which slightly exceeds the depth of the groove so that it bears against the surface of the doctor blade.

In use, the doctoring edge, 3A, of the doctor blade is in firm contact with a moving substrate, (not shown) against which it is urged by the leaf spring, 4. The compression of the leaf spring is adjusted using the screws, 6, to give the desired firmness of contact with the substrate.

Any unevenness in the surface of the substrate as it moves past the doctor blade generates a response in the blade that tends to accommodate such unevenness by localized movement towards or away from the resilient means with minimum change in local contact pressure. The squirmer deforms in its groove to accommodate such motion.

In FIG. 2, the blade holder is that described in FIG. 1, except that the leaf spring is replaced by an inflated tube, 9, the pressure in which is controllable by the use of inflating means (not shown) and the adjusting screw device is no longer used. The blade holder is additionally provided with a backing plate, 10, accommodated in a relief, 11, in one wall of the slot and sandwiched between the blade and the holder. The holder is in two parts secured by bolts, 20, (one shown) and the inflatable tube bears against a plate, 3C, which is of such size that it prevents expansion of the tube down the slot when the blade is absent therefrom and yet may be displaced by deformation of the tube when the blade is forced deeper inside the holder by local pressure on the doctoring edge.

In FIG. 3 the holder is similar to that in FIG. 2 except that the inflatable tube of FIG. 2 is replaced by a plurality of coiled springs, 14, terminating in contact plates, 13, which bear against a beading, 12, formed on the edge of the doctor blade opposed to the doctoring edge. This beading, which replaces the double flanges on the blades in FIGS. 1 and 2, is loosely retained in a cylindrical channel, 15, of diameter greater than that of the beading, 12. As in FIG. 2, a backing plate, 10, secures the blade against excessive flexing.

In FIG. 4 the blade holder, 1, is provided with a slot, 2, which is closed at one end by a spring device, 16. One wall of the slot is provided with bearings, 17, (only one shown) in spring seatings, 18, with the bearings projecting into the slot and, when the doctor blade is in place, into apertures formed in the doctor blade, 19, such that the degree of movement of the blade into and out of the slot is restricted.

The embodiments described above with reference to FIGS. 1 to 4 do not exhaust the potential variations in the basic invention. Features are moreover to some extent interchangeable such that the backing plate shown in FIGS. 1 and 4 and the bearing/aperture combination of FIG. 4 can replace the shaped edge/channel combinations shown in FIGS. 1 to 3.

The above description of the illustrated embodiment is not intended to imply any limitation on the possible variations of the device herein described. It is anticipated that a number of variations and modifications to the doctor blade holder of the invention could be made without changing the essential character thereof. It is intended that all such variations and modifications should be embraced within the purview of this invention.

What is claimed is:

1. A doctor blade holder comprising a body member having a slot adapted to receive a doctor blade in a slidable fit within the slot with the doctoring edge of the blade projecting from the open end of the slot said holder being provided with:
    A. a resilient means, disposed within the slot, adapted to bias a doctor blade retained within the slot away from the closed end of the slot;
    B. a groove located in one wall of the slot running parallel to the closed end of the slot; and
    C. a squirmer located within said groove so as to press resiliently against the surface of a doctor blade placed within the slot and restrict the movement of such a blade in a direction perpendicular to the sides of the slot but permit movement of such a blade in response to compression or expansion of the resilient means.

2. The doctor blade holder of claim 1 wherein the resilient means is disposed in a channel formed at the closed end of the slot and providing a portion of the slot of increased width.

3. The doctor blade holder of claim 2 wherein the channel is adapted to cooperate with a doctor blade having a flange formed on the edge opposed to its doctoring edge such that the flanged portion of the blade is loosely retained within the channel.

4. The doctor blade holder of claim 1 in which the resilient means comprises a resilient tube.

5. The doctor blade holder of claim 4 in which the resilient tube is an inflatable tube.

6. A doctor blade holder comprising
    1. a body member having a slot formed therein and a channel at the closed end of said slot providing a portion of the slot with increased width, said holder being adapted to receive a doctor blade in a slidable fit within the slot with its doctoring edge projecting from the open end of the slot and with an enlarged portion of the edge of the doctor blade opposed to the doctoring edge loosely retained within said channel,
    2. an inflatable tube disposed within the channel and adapted to bias a doctor blade retained in the holder away from the closed end of the slot, and
    3. a squirmer located in a groove in one wall of the slot running parallel to the closed end of the slot, said squirmer being adapted to provide a resilient pressure against a surface of a doctor blade inserted into the slot and restrict movement of such a blade in a direction perpendicular to the sides of the slot but permit movement of such a blade in response to compression or expansion of the resilient means.

* * * * *